Figure 2:
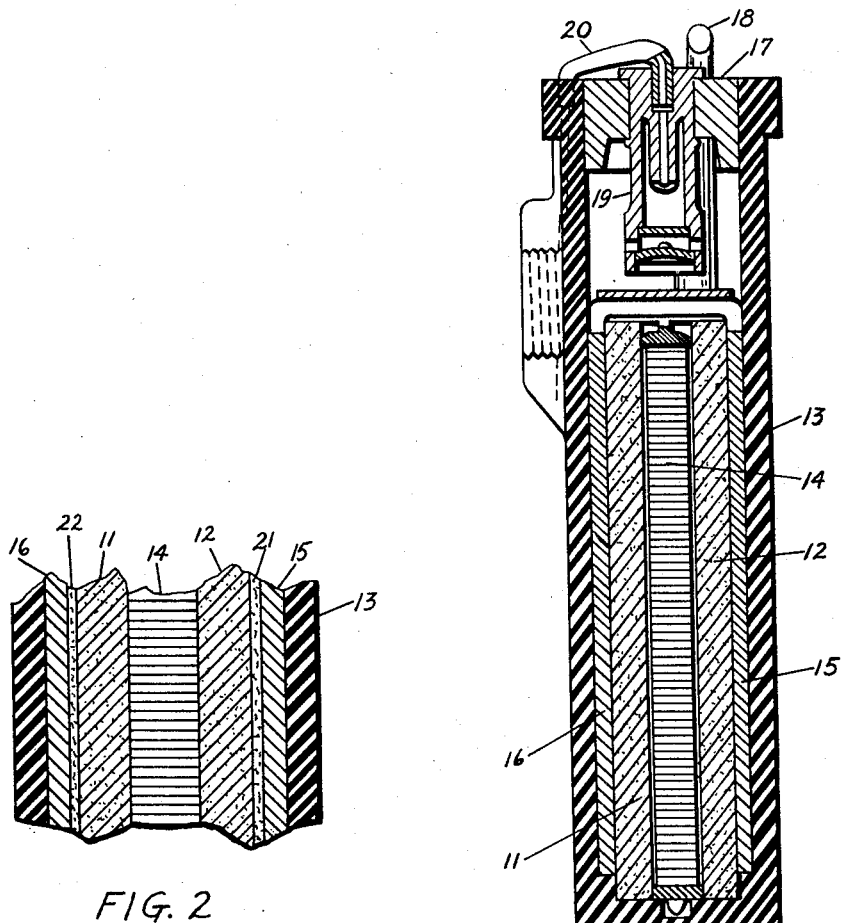

Nov. 10, 1959 A. B. POOLE 2,912,479
SEPARATORS FOR STORAGE BATTERIES AND METHOD OF MAKING THEM
Filed April 11, 1957

FIG. I

INVENTOR.
ALTON B. POOLE
BY
AGENT

United States Patent Office 2,912,479
Patented Nov. 10, 1959

2,912,479

SEPARATORS FOR STORAGE BATTERIES AND METHOD OF MAKING THEM

Alton B. Poole, Abington, Mass., assignor, by mesne assignments, to Koehler Manufacturing Company, Marlboro, Mass., a corporation of Massachusetts Application April 11, 1957, Serial No. 652,129

5 Claims. (Cl. 136—146)

This invention relates to a battery separator suitable for use in miners' electric cap lamp batteries and other non-spillable batteries, and is a continuation-in-part of my copending application Serial No. 429,787 filed May 14, 1954, and now abandoned.

In the construction of miners' electric cap lamp batteries, it is important to provide battery separators which will almost completely absorb the electrolyte and thus prevent spillage of any appreciable amount of the electrolyte, regardless of the position of the battery. Spillage of minor amounts of electrolyte from such a battery can be readily prevented by suitable arrangement of venting holes and filling openings. A separator material for such non-spillable batteries, therefore, must have a high degree of absorbency, preferably above 60% by volume, be resistant to battery acids, and have sufficient strength for handling during assembly with the electrodes or plates in the battery case. In addition to possessing dimensional stability, the separator material should also be non-conductive of electricity, have a minimum content of soluble salts or other ionizable compounds, the ability to absorb the electrolyte without swelling in size, and be capable of being made to fine tolerances.

Heretofore, best results have been obtained with balsa wood separators. To obtain maximum electrolytic pick-up, such balsa wood separators are pre-compressed and pre-soaked before assembly in the battery. Their volume pick-up for battery electrolyte is about 55-75% based on the final volume of the separator. These balsa wood separators, however, have a limited acid resistance and, after being in use for some time, lose their original firmness, not retaining sufficient strength and shape stability to prevent excessive expansion of the negative plates of the battery. It has been suggested that storage battery separators also be made from diatomaceous earth with vulcanized rubber. This has been done by completely coating the diatomaceous earth with rubber, thereby greatly decreasing the porosity of such separators. Under the microscope, the diatomaceous earth particles in such separators appear to be completely coated. It has furthermore been suggested that diatomaceous earth be bonded with emulsions and a cementing agent in the dispersed phase to provide a separator having diatomaceous earth particles in spaced relationship to each other, providing pores, the diatomaceous earth particles being bonded to form a solid mass by cementing with vulcanized rubber particles or other scattered particles of binding or cementing material. In this second procedure, approximately 25% by weight of the bonding agent was used and the bonding was effected by removing the dispersed phase so that the dispersed phase would coagulate at points of contact of the diatomaceous earth particles in spaced relationship and, thus, not clog up the pores of the diatomaceous earth or the interstices between the spaced diatomaceous earth particles.

An object of this invention is to make a battery separator which is compressible, thus permitting the usual slight expansion of the negative electrode against the separator without impairing the absorbing power of the separator.

Another object of this invention is to prepare a battery separator the thickness of which may be accurately controlled to fine tolerances.

A further object of this invention is to make a battery separator having high absorption for the battery electrolyte while remaining dimensionally stable during the life of the battery.

Still another object is to make a battery separator which will be light in weight.

These, and other objects will become apparent in the following description of this invention.

The present invention in contradistinction to those described above, is based on the discovery that battery separators, particularly separators for miners' electric cap lamp batteries, of greatly improved properties can be made from a composition comprised of a comminuted, hard, siliceous gel, a substantially pure, finely divided silica, a binding agent, a foaming agent, and, if desired glass fibers for added strength. The resulting separator is dimensionally stable, capable of accurate thickness control, non-swelling, and capable of absorbing at least 70% and up to between 80% and 85% of its volume of electrolyte. In addition, it is light in weight, and it can be compressed, thus permitting the expansion of the negative plate without impairment to its absorbing properties. All components of the composition should be substantially free of electrolytes, chlorine and metallic impurities.

By using both the hard, siliceous gel and the pure, finely divided silica in combination, it is possible to achieve better packing qualities and a more effective matrix for holding the battery acid. The glass fibers contribute strength and the use of a foaming agent permits the adjustment of the pore size in the finished separator. The materials used in formulating these battery separators permit rolling the final separator to a desired thickness within very close tolerances. At the same time, the separators possess sufficient resiliency and flexibility to permit handling and installation in the battery without damaging the absorbing properties of the separators.

For battery separators of the type described according to our invention the siliceous gel should be a hard, not readily compressible gel, having a high internal surface area and thus, a high volume pickup for the electrolyte. In particular, diatomaceous earth, a natural silica gel of high internal surface and a low compressibility when closely packed, is useful for the purposes of this present invention. In spite of the inherent incompressibility of diatomaceous earth, its particles present a rather smooth surface which permits relatively easy flow when they are subjected to pressure in the formation of the separators. Silica gels prepared by acidification of soluble silicates, washing, and subsequent drying according to the usual commercial practice can also be used, even though the rather sharp-cornered surfaces of the individual particles do not permit them to be as readily molded as the diatomaceous earth particles. In general, silica gels suitable for the present invention should have a silica ($SiO_2$) content of about 80% or more (ignited basis) and should contain a minimum of soluble salts and metallic impurities and, in particular, be free from chlorine above trace amounts. The volume pick-up of the silica gels for battery acid prior to their being molded into the separator should be in excess of 75% by volume.

The finely divided silica must be a pure, soft, compressible material, which may be prepared by the removal of water from the acidification product of a soluble silica solution by replacement with an organic liquid rather than by drying and removal of the latter above critical condition. It may also be prepared by the hydrolysis or combustion of organic siliceous compounds. The finely-divided silica should have an average ultimate particle size range of from about 10 to 30 millimicrons, as determined by the electron microscope. The attainment of a large, specific surface is important, and for the purpose of this invention, the finely divided silica should have a specific surface of about 200 square meters per gram or greater.

The finely divided silica serves as more than a filler in this battery separator composition. This is shown by the fact that its use can cause the battery separator to adhere strongly to the plate which would be of special advantage for wrap-around separators. Additional evidence that the finely divided silica serves as more than a binder is offered by the fact that its presence prevents the binder from migrating. The finely divided silica also contributes materially to the dimensional stability of the separator.

The binding agent is preferably a natural rubber latex which contains no free metallic ions. It should be resistant to sulfuric acid and should be capable of wetting the finely divided silica. A suitable wetting agent may be added if desirable. Synthetic binding agents such as Saran (vinylidene chloride) and Rhoplex (acrylic emulsions) may also be used, but care must be taken to select a synthetic binding agent which does not contain an emulsifier which will deteriorate over the life of the separator, or which will not adversely affect the other components of the battery separator. It may be desirable to add a stabilizer for the binding agent; such a stabilizer is one which does not deteriorate or adversely affect the other separator components during the life of the separator.

The glass fiber, if used, must be pure in that it does not have a sizing or coating on it, or contain metal impurities. The preferred type of glass fiber is that which is designated electrical conductivity grade. In addition to being pure, the glass fiber should be of a relatively fine diameter, preferably of the range from 0.00016 to 0.00056 inch. This glass fiber contributes to the strength of the separator, making it possible to handle the separator during manufacture and installation. However, satisfactory results can be achieved without the addition of glass fibers.

The foaming agent must contain a compound capable of releasing ammonia gas at temperatures below those at which decomposition of the binding agent or other components will take place, and must be capable of causing foaming (i.e. formation of small air bubbles) of the mixture when it is beaten together or agitated to make the mix from which the separators are formed. The foaming agent must of course not cause the presence in the finished separator of any electrolytes or other material deleterious to the operation of the separator in regular use. Ammonium stearate has been found to be a very satisfactory foaming agent, as it is effective in bubble formation, and it supplies ammonia gas upon decomposition leaving the inert stearate compound. It also serves as an effective stabilizer for the latex binder. Additional ammonia gas, added in the form of a solution of ammonium hydroxide, may also be a desirable constituent of the foaming agent. The foaming agent may thus be a mixture of compounds, and may include some such as licorice extract which are good foam formers but do not release ammonia gas on heating; nevertheless the foaming agent as a whole must fulfill the foregoing requirements regarding foaming, ammonia release, and freedom from deleterious materials.

In preparing and molding separators according to the present invention, the hard, siliceous gel is mixed with water to form a dispersion and into this dispersion is mixed a pre-formed colloidal solution of the foaming agent and binder. Mixing by mechanical means is continued and the finely divided silica, glass fibers and some additional foaming agent are added. The final mixture is beaten, with consequent foam formation until a predetermined volume is attained. The mixture is cast into molds or extruded into a desired form.

The drying of the separator is preferably done at an elevated temperature, but below the temperature at which decomposition of the binding agent occurs. Thus, drying temperatures should not exceed about 160° F. if natural rubber latex is used for the binding agent because above about 160° F. there is too rapid oxidation of the rubber. Temperatures just under 160° F. permit accelerated drying and at the same time release ammonia gas from the ammonia compound, while driving off the water to leave a porous, cavernulous structure. Drying may be done in an oven, in a gas stream or by any other suitable means. After the cast separator has been thoroughly dried, it is removed from the mold.

The cast pieces, after drying, may be rolled to close tolerances to give a desired thickness. Rolling apparently breaks down some of the bubble walls built up in the separator, thus giving it an increased acid pick-up. The separator can, however, be rolled too thin, thus breaking down so many walls that it becomes structurally weak, the acid pick-up is lowered and the drainage of acid becomes a problem. Thus, the degree of rolling permissible to adjust the thickness and attain an optimum acid pick-up must be determined for each particular separator composition used.

The molded or extruded separator pieces may be rolled, as noted, or sized and cut. Glass fiber mats may be put on one or both sides of the final separator to give it additional strength.

A typical battery containing separators of this invention is shown in cross-section in Fig. 1, wherein the numeral 13 represents a battery case or jar made of any suitable material customarily used for this purpose, such as Bakelite or rubber compositions. Within this case 13 are placed, for example, a positive plate 14 and two negative plates 15 and 16 with the separators 11 and 12 of this invention occupying the entire space between the negative and positive plates. The case 13 is provided with a cover 17 through which extend the usual leads (one of which is indicated at 18) from the positive and the negative plates to the outside of the battery. A suitable non-spilling device, such as that shown at 19, with a vent 20, is preferably provided.

A modified arrangement is shown in Fig. 2 wherein like numerals refer to like parts as in Fig. 1, but with the addition of fiber glass spacers 21 and 22. These fiber glass spacers, which may be conveniently made by cutting from a thin mat of fibrous glass, are helpful in providing resiliency in order to minimize any possible danger of cracking of the separators, especially during assembly. These spacers 21, 22 may be located between the separators 11, 12 and negative plates 15, 16 as shown in Fig. 2, or they may be located between the separators and the positive plate 14. The use of these spacers is optional; they may be omitted as shown in Fig. 1.

The preparation of battery separators according to the present invention is further illustrated in the following example without, however, being limited thereto:

A battery separator useful for non-spillable miners' electric cap lamp batteries was prepared from the following composition:

| | Parts by weight |
|---|---|
| Diatomaceous earth | 29.8 |
| Water | 43.2 |
| Ammonium stearate (28% collodial solution) | 2.0 |
| Natural rubber latex (42% solids by weight) | 7.2 |
| Finely divided silica (Cab-o-sil) | 12.4 |
| Glass fiber, electrical conductivity grade | 2.2 |
| Ammonium hydroxide (28% water solution) | 3.2 |
| Total | 100.0 |

The diatomaceous earth was mechanically mixed with one-half of the water for about three minutes. The ammonium stearate was stirred into the remaining half of the water and the solution heated and then allowed to cool to room temperature. About one-third of the ammonium hydroxide was added to the cooled solution and after stirring, the rubber latex was mixed in. The ammonium stearate-ammonium hydroxide-latex mixture was then mixed with the water dispersion of diatomaceous earth until the entire mixture acquired a creamy texture. To this was slowly added the finely divided silica, then the glass fibers with only sufficient beating to get the fibers mixed well. Finally, the remaining ammonium hydroxide was added and the entire mass was beaten slowly, whereby a foaming of the mixture occurred and its volume increased about 85% due to the air being thus entrapped in the mass in fine bubbles. The resulting mixture in the form of a relatively stiff foamy or frothy mass, was cast into molds and the molds were placed in an oven at 160° F. for about three hours. The resulting separator had an apparent density of 0.32 and an acid pick-up of about 80% as compared with about 69% for a typical balsa wood separator. This pick-up could be raised to about 85% by rolling the separator sufficiently, but it became very weak structurally. The draining characteristics of this battery separator were as good as, or better than, those of balsa wood separators.

In the above example, which illustrates a preferred composition, the quantities are about 30 percent diatomaceous earth, 12 percent finely divided pure silica, 50 percent water (from all sources), 3 percent latex binder, and 2 percent glass fiber, the balance being foaming agent. All proportions are by weight, and all (except water, of course) are dry basis.

The proportions indicated in the above example may be varied within certain limits. Specifically, satisfactory compositions for the purposes of this invention may consist of 20 to 40 percent by weight hard silica gel (e.g. diatomaceous earth), 5 to 25 percent finely divided pure silica, 40 to 60 percent water (from all sources), 2.5 to 7 percent binder (dry basis), and 1 to 4 percent foaming agent (dry basis). Glass fibers, if used, may be included in an amount up to say 5 percent or somewhat higher. The following observations will serve as a guide to obtaining good results with formulations within these over-all ranges. Specifically, the quantities of binder will be determined by the ratio of hard silica gel to finely divided silica gel, i.e., the more finely divided silica gel used, the more binder will be required. Less than about 2.5 percent binder (dry basis), however, results in a separator which is structurally too weak for practical purposes; more than about 7 percent binder causes an undesirable decrease in porosity in the separator. The amount of ammonium stearate or other foaming agent depends upon the amount of binder used and the degree of foaming desired. Proper balance of the quantities of these ingredients and of the water should be attained so as to provide a foamed mass which is firm enough to retain its shape when introduced into the molds and dried, thus achieving adequate porosity and acid pick-up properties in the final separator. An increase in volume by foaming of about 50% to 110%, over the volume of an unfoamed mixture of the ingredients, is preferred. Varying the relative amounts of hard silica gel and finely divided silica and binder also assists in control of the amount and rate of acid pick-up in the final separator.

Battery separators made according to the present invention have been extensively tested and used in batteries and found to have superior properties as compared with separators previously available. In particular, they exhibit a useful life expectancy approaching that of the battery proper. In plates and other components of the battery proper. In addition, they have a marked increase in pick-up over conventional separators, are structurally strong enough to handle easily, and dimensionally stable since they neither shrink nor swell in use. Battery separators prepared in accordance with this invention may be cast wet upon the plate, thus forming a separator-plate unit for insertion in the battery. When formed in this manner, the separator adheres very tightly to the plate without the use of any additional adhesive or adhering agent. Thus, it would be possible to use this technique in preparing a wrap-around type of separator. Furthermore, the ability of separators, prepared by this invention, to conform readily to the contours of the plate prevents the flaked-off lead oxide particles from the plate from dropping down and forming a sludge in the battery.

Having now described my invention, what I claim is:

1. A composition adapted for the manufacture of separators for storage batteries of the non-spillable type, consisting essentially of 20 to 40 percent of a comminuted, hard silica gel, 5 to 25 percent finely divided, pure, soft, compressible silica, 40 to 60 percent water, 2.5 to 7 percent binder, dry basis, and 1 to 4 percent foaming agent, dry basis, parts being by weight, said composition being substantially free from electrolytes, chlorine, and metallic impurities, said foaming agent comprising at least one ammonium compound which releases ammonia gas upon being subjected to an elevated temperature below that at which decomposition of said binder occurs, said composition being such that upon beating its volume increases, by foaming, by about 50–110%.

2. A composition according to claim 1, further characterized in that it contains glass fibers in an amount of not over 5 percent by weight.

3. A composition adapted for the manufacture of separators for storage batteries of the non-spillable type, consisting of about 30 percent by weight diatomaceous earth, about 12 percent by weight finely divided, pure, soft, compressible silica, about 50 percent by weight water from all sources, about 3 percent by weight binder, dry basis, and up to about 2 percent by weight glass fibers, the balance being foaming agent, said composition being substantially free from electrolytes, chlorine, and metallic impurities, said foaming agent comprising at least one ammonium compound which releases ammonia gas upon being subjected to an elevated temperature below that at which decomposition of said binder occurs, said composition being such that upon beating its volume increases, by foaming, by about 50–110%.

4. The method of making a battery separator which comprises preparing a dispersion of 20 to 40 weight percent comminuted, hard silica gel, 5 to 25 weight percent finely divided, pure, soft, compressible silica, 2.5 to 7 weight percent binder, dry basis, 1 to 4 weight percent foaming agent, dry basis, said foaming agent containing an ammonium compound, and 40 to 60 weight percent water, agitating said dispersion to introduce fine air bubbles and thereby to increase its volume by 50 to 110 percent, forming the resulting foamed composition into shapes and drying the same while substantially retaining its shape, to remove the water and drive off ammonia gas and provide a porous cavernulous separator capable of absorbing at least 70% of its volume of electrolyte.

5. The method in accordance with claim 4, further characterized in that the dried separator is subjected to rolling pressure sufficient to break down a portion of the internal bubble-wall structure and increase its said absorbing capacity to about 85% but insufficient to weaken the separator excessively.

References Cited in the file of this patent

UNITED STATES PATENTS

| | | |
|---|---|---|
| Re. 18,214 | Behrman | Sept. 29, 1931 |
| 1,200,345 | Hardy et al. | Oct. 3, 1916 |
| 1,405,627 | Petrie | Feb. 7, 1922 |
| 2,043,954 | Kershaw | June 9, 1936 |
| 2,155,016 | Kershaw | Apr. 18, 1939 |
| 2,181,299 | Burgess | Nov. 28, 1939 |
| 2,624,768 | Toulmin | Jan. 6, 1953 |
| 2,772,322 | Witt et al. | Nov. 27, 1956 |